United States Patent [19]

Nagai

[11] Patent Number: 5,331,618
[45] Date of Patent: Jul. 19, 1994

[54] SYNCHRONIZING SIGNAL DETECTOR FOR MULTI-BEAM OPTICAL DISK UNIT

[75] Inventor: Satoshi Nagai, Tachikawa, Japan

[73] Assignee: ASACA Corporation, Tokyo, Japan

[21] Appl. No.: 983,384

[22] Filed: Nov. 30, 1992

Related U.S. Application Data

[63] Continuation-in-part of Ser. No. 624,295, Dec. 7, 1990, abandoned.

[30] Foreign Application Priority Data

Dec. 14, 1989 [JP] Japan .................................. 1-324408

[51] Int. Cl.[5] .......................... H04N 5/76; G11B 7/00; G11B 5/02
[52] U.S. Cl. ................................... 369/59; 369/44.37; 360/59
[58] Field of Search ...................... 369/47, 48, 49, 59, 369/60, 44.37; 360/59

[56] References Cited

U.S. PATENT DOCUMENTS

| | | | |
|---|---|---|---|
| 4,283,777 | 8/1981 | Curry et al. | 369/44.37 |
| 4,450,552 | 5/1984 | Marcantonio | 369/267 |
| 4,872,155 | 10/1989 | Yokogawa et al. | 369/59 |
| 5,088,080 | 2/1992 | Ishibushi et al. | 369/48 |

*Primary Examiner*—Donald Hajec
*Assistant Examiner*—Won Tae C. Kim
*Attorney, Agent, or Firm*—Emmanuel J. Lobato; Robert E. Burns

[57] ABSTRACT

There is disclosed a synchronizing signal detector for a multi-beam optical disk unit employing a semiconductor laser array as an optical head, in which detection of a synchronizing signal is performed when all-bit coincident is detected in one half or more of multi-beams or when almost all-bit coincident is detected for a beam within a small number of bits before or after the all-bit coincident in another beam. Once a first synchronizing signal of each sector is detected, synchronizing signals of the subsequent second, third, ... blocks can be detected without fail through utilization of a flywheel signal generator

4 Claims, 6 Drawing Sheets

| BLOCK SYNCHRONIZING SIGNAL | 0 0 1 0 0 0 0 0 | 0 0 0 1 0 1 0 0 | 0 1 0 1 0 0 1 0 |
| PRE-SYNCHRONIZING SIGNAL | 0 1 0 0 1 0 1 0 | 0 0 1 0 1 0 0 0 | 0 0 0 0 0 1 0 0 |

(1) REPRODUCED DATA

←─SYNCHRONIZING SIGNAL─→

(2) OUTPUT OF SHIFT REGISTER 27

3-BITS DELAYED DATA    1 0 1 0 0 1 0 0 0 -----

2-BITS DELAYED DATA    0 1 0 0 1 0 0 0 -----

1-BIT DELAYED DATA    1 0 0 1 0 0 0 -------

NOT DELAYED DATA    0 0 1 0 0 0 --------

(3) INPUT OF COUNTER 29  [EACH BIT WITH MARK ▲ IS VARIED by DATA]

3-BITS DELAYED DATA    0̲ 1̲ 1̲ 1 1 0 ----

2-BITS DELAYED DATA    1̲ 0̲ 0 1 0 1 ----

1-BIT DELAYED DATA    0̲ 1 0 0 1 1 ----

NOT DELAYED DATA    1 1 1 1 1 1 ----

SYNCHRONIZING SIGNAL DETECTOR FOR MULTI-BEAM OPTICAL DISK UNIT

This is a continuation-in-part application of application Ser. No. 07/624,295, filed Dec. 7, 1990, and now abandoned.

BACKGROUND OF THE INVENTION

The present invention relates to a synchronizing signal detector for a multi-beam optical disk unit.

For precise synchronization of signals to be reproduced from respective tracks from an optical disk, correct detection of the synchronization signals is essential. However, it is very difficult to correctly detect the synchronization signals due to a fluctuation of a time interval between synchronizing signals, a fluctuation of the beam interval, and a drop-out of any synchronizing signal.

SUMMARY OF THE INVENTION

It is an object of the present invention to provide a synchronizing signal detector which is suitable for use in a multi-beam optical disk unit of the type employing a semiconductor laser array as an optical head, and which is capable of preventing a dropout of a synchronizing signal included in the reproduced signal through a failure of its detection and preventing an erroneous detection of a false signal as a block synchronizing signal.

To attain the above object, the synchronizing signal detector comprising n detecting circuits, for a multi-beam optical disk unit of n optical beams according to the present invention, using integers n, p, m, c, b, q more than one, each of said n detecting circuits comprising: a register for storing a p-bit reference synchronizing pattern; p-exclusive-NOR circuits for detecting coincidence between each pulse of p-pulses reproduced from a corresponding one of said n-optical beams and each pulse of the p-bit reference synchronizing signal pattern to produce coincidence pulses each in response to said coincidence; a counter for counting the number of coincident pulse from the p-exclusive-NOR circuits to generate an all-bit coincident signal when bits of the reproduced p-pulses are all coincident with bits of said reference synchronizing signal pattern and to generate a q or more bit coincident signal when q (where $0<g<p$) or more bits reproduced from the corresponding one of said n-optical beams are coincident with bits of said reference synchronizing signal pattern; pulse means for supplying the all-bit coincident signal to each of other $N-1$ detecting circuits and for receiving the all-bit coincident signal from the other $N-1$ detecting circuits; window pulse generating means for generating, when the all-bit coincident signal is generated by the counter for at least m ($0<m<n$) of the n-optical beams, a window pulse having an arbitrary b-bit width starting at the all-bit coincident synchronizing signal; a delay circuit for delaying by c-bits (where $c\approx b/2$) a q or more bit coincident signal; and an AND circuit for ANDing the output of the delay circuit and the window pulse. The output pulses of the AND circuit are used as detected synchronizing signal for the corresponding one of the optical beams.

BRIEF DESCRIPTION OF THE DRAWINGS

The present invention will be described in detail below in comparison with prior art with reference to accompanying drawings, in which.

DETAILED DESCRIPTION

Figure 1:
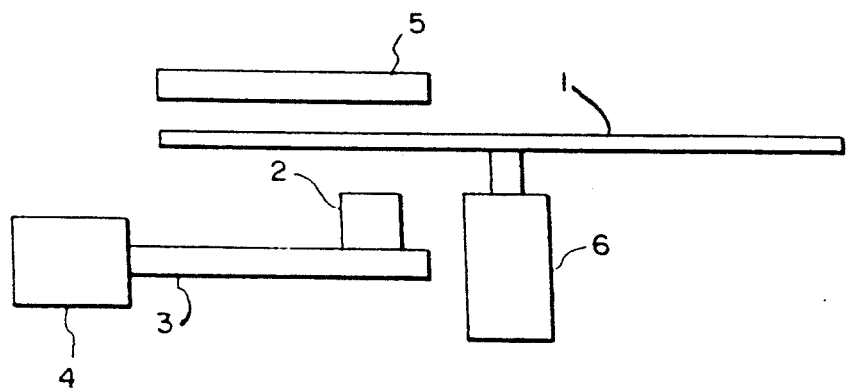
FIG. 1 is a front view showing the basic construction of a magneto-optical disk drive embodying the present invention.

FIG. 1 shows a basic constitution of an example of a magneto-optical disk drive. Reference numeral 1 indicates a magneto-optical disk, 2 an optical head, 3 a slider, 4 an actuator for the slider, 5 an electromagnet for generating erasing and recording magnetic fields, and 6 a spindle motor.

Figure 2:
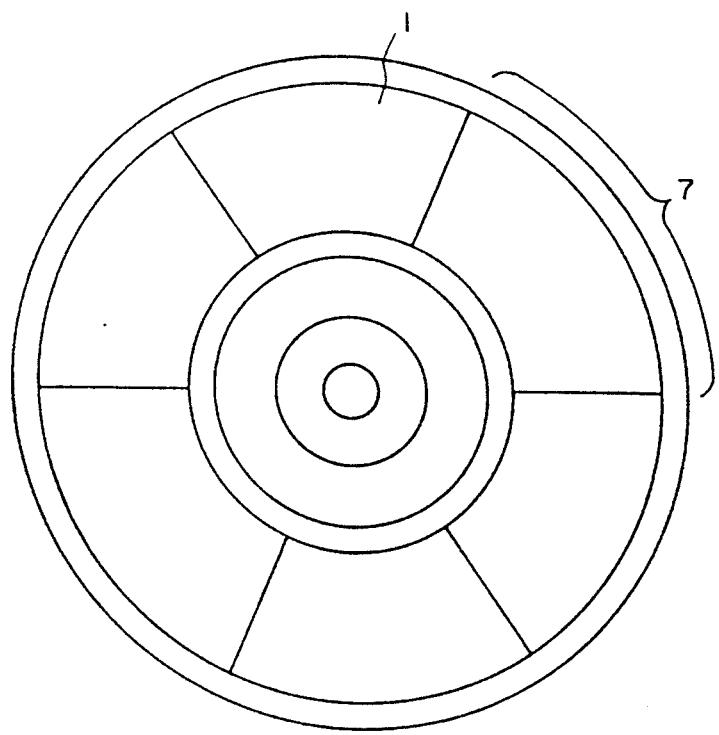
FIG. 2 is a plan view schematically showing a recording format pattern on a disk for use in the present invention.

The magneto-optical disk 1 has its recording area divided into a plurality of sectors, six in the example shown in FIG. 2.

Figure 3:
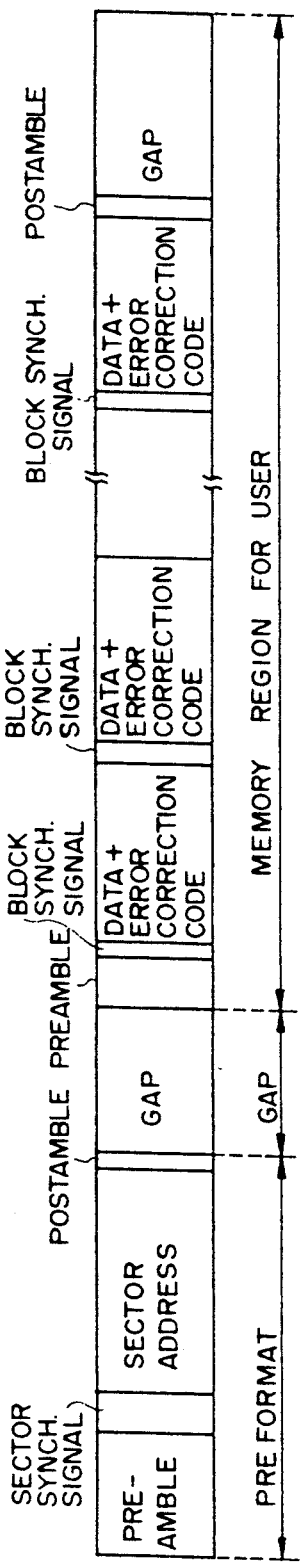
FIG. 3 is a diagram showing a conventional sector recording format.

For accurate synchronization of signals for recording and playback of the optical disk there are employed, in combination, three kinds of techniques such as bit synchronization, block synchronization and sector synchronization. In the optical disk 1, as shown in its sector recording format of FIG. 3, a preamble, a sector synchronization signal, a sector address, etc. are recorded, as a preformat, before a user recording area. Recording of data starts with bit synchronization, then by reading the sector address. When a target sector is detected, data is recorded in a predetermined format. In the data there are inserted block synchronization signals at regular intervals.

In the case of playback, the target sector is searched using the sector address, bit synchronization is performed in the preamble in the user recording area and then data is sequentially read out using the block synchronization signals inserted therein.

The data transfer rate can be increased by using a plurality of optical beams, for example, four optical beams. The four beams from the optical head are used to record data simultaneously on four tracks in parallel and to reproduce therefrom the data accordingly.

This calls for precise synchronization of signals to be reproduced from the respective tracks, but the use of a multi-beam laser array precludes the necessity of employing a complex control function therefor. Even if the multi-beam laser array is employed, however, a time interval between synchronizing signals fluctuates owing to undesired speed variations and off-center hole (wow and flutter) of the disk, for instance. The beam interval also differs with laser arrays due to "dispersion" introduced during their manufacture process or to the dispersion of their head mounting angle in each disk drive unit. Further, the beam intervals differs between reproduction from inner tracks of the disk and reproduction from outer tracks thereof. Besides, there are cases where all bits of the synchronizing signal are not completely reproduced, that is, some of them drop out, and where the phase of the synchronizing signal included in the signal reproduced from each track is incorrect. Moreover, a data signal hardly distinguishable from the synchronizing signal may sometimes be mistaken for the synchronizing signal.

The present invention will now be described to resolve the above problems in correctly detecting a synchronizing signal.

An embodiment of the present invention will hereinafter be described as being applied to a multi-beam optical disk unit which employs a 4-beam semiconductor laser array in the optical head and performs synchronous, parallel reproduction of data from four tracks recorded synchronously and in parallel.

Since synchronizing signals of four channels which are reproduced from four tracks are detected in exactly the same manner, the detection of the synchronizing signal in one channel will be described.

Figure 4:
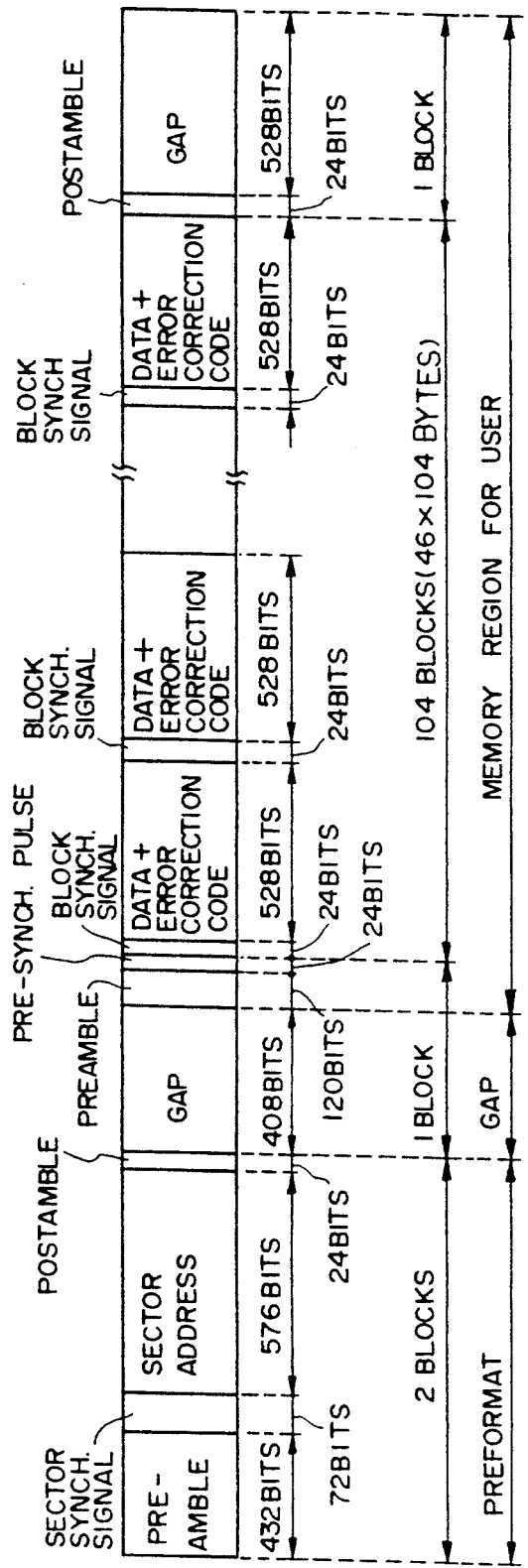
FIG. 4 is a diagram schematically showing a sector recording format according to an embodiment of the present invention.

The magneto-optical disk 1 has its recording area divided into six radial sectors 7 as shown in FIG. 2. The recording format of each sector is composed of a preformat, a gap, and a user recording area as depicted in FIG. 4. The user recording area includes a preamble, a pre-synchronizing signal, and a 104-block data recording area, each block being preceded by a 24-bit block synchronizing signal. In the embodiment of the present invention the pre-synchronizing signal is positioned immediately before a first "block synchronizing signal" of each sector 7, for detecting the beginning of the user recording area of each sector 7. Where the block synchronizing signal is detected at the beginning of the sector 7 with no pre-synchronizing signal being detected, the block synchronizing signal is regarded as a first "block synchronizing signal" (hereinafter referred to as a "first block synchronizing signal") of the sector. Where the pre-synchronizing signal is detected but the first block synchronizing signal is not detected, the former is regarded as the first block synchronizing signal. In short, the pre-synchronizing signal is used to provide redundancy in the detection of the first block synchronizing signal at the beginning of the sector, thereby ensuring the detection of the first block synchronizing signal for each sector which is liable to become unstable as compared with the detection of block synchronizing signals of second, third, . . . blocks. Once the first block synchronizing signal of each sector is detected, the block synchronizing signals of the subsequent second, third, . . . blocks can be detected without fail through utilization of a flywheel signal generator described later.

Figures 5, 6:
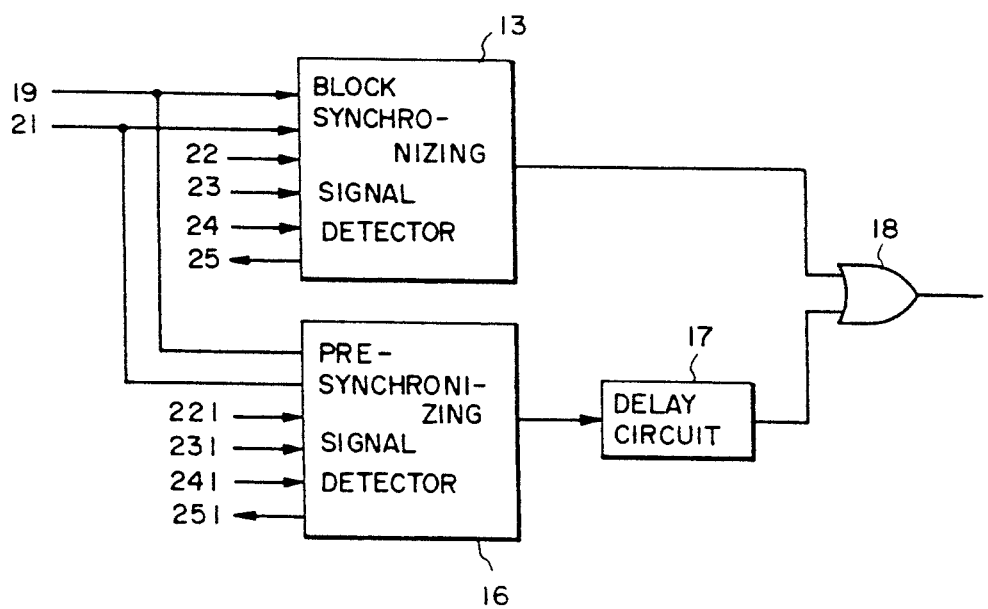
FIG. 5 is a block diagram explanatory of the detection of a synchronizing signal according to the present invention.
FIG. 6 illustrates diagrams showing synchronizing signal bit patterns according to the present invention.

FIG. 5 is a block diagram, for explaining the detection of the synchronizing signal according to the present invention. Channels one through four are identical in construction. Reference numeral 13 indicates a block synchronizing signal from a disk having recorded thereon data in such a format as shown in FIG. 4. The block synchronizing signal detector 13 will be described with reference to FIG. 7. Where no block synchronizing signal is detected by the block synchronizing signal detector 13, a signal, by which the block synchronizing signal having dropped out is interpolated at the timing when it is to be detected, is created by an internal counter in a flywheel signal generator not shown.

Reference numeral 21 indicates a data signal reproduced from the disk, and 22, 23 and 24 pulses each having an a-bit, for example, 8-bit width produced using, as a trigger, the all-bit coincident block synchronizing signal detected from the reproduced signal in each of three other channels, i.e. from each of three other tracks. Reference numeral 25 denotes a pulse of an 8-bit width produced using, as a trigger, the all-bit coincident block synchronizing signal, the pulse 25 being provided to each block synchronizing signal detector of the three other channels.

Reference numerals 221, 231, 241 and 251 in a pre-cynchronizing signal detector 16 designate pulses corresponding to those 22, 23, 24 and 25 of the above-mentioned block synchronizing signal detector 13. These pulses can be explained by replacing the "pre-synchronizing signal" for the "block synchronizing signal" in the above description given of the pulses 22, 23, 24 and 25.

The pre-synchronizing signal detected from the pre-synchronizing signal detector 16 is applied via a delay circuit 17 to an OR circuit 18, wherein it is ORed with the block synchronizing signal from the block synchronizing signal detector 13. The delay time of the delay circuit 17 is the time interval between the pre-synchronizing signal and the block synchronizing signal. By this, the first block synchronizing signal can be reproduced correctly, even if either one of the pre-synchronizing signal and the first block synchronizing signal drops out. In a case where the synchronizing signals of the second, third, . . . blocks drop out, they are interpolated by the afore-mentioned flywheel signal generator.

In this embodiment no complicated control circuit is needed for the synchronizing signal detection, since spots of optical beams are spaced apart with an appreciably high degree of accuracy through use of the 4-beam semiconductor laser array. According to the present invention, precisely synchronized signals can be obtained by reproducing signals correctly including first, second, third, . . . block synchronizing signals and applying the signals to a FIFO (First-In First-Out) memory of a small capacity, say, several bytes.

The block synchronizing signal detector 13, the pre-synchronizing detector 16 and the flywheel signal generator (not shown) operate on clock pulses included in the reproduced signal from the disk 1. On the other hand, the circuit structure subsequent to the FIFO memory is synchronized with data by external precise reference clock pulses, because respective bits are synchronized more precisely by the action of the FIFO memory.

FIG. 6 shows formats of the pre-synchronizing signal and the block synchronizing signal.

Figure 7:
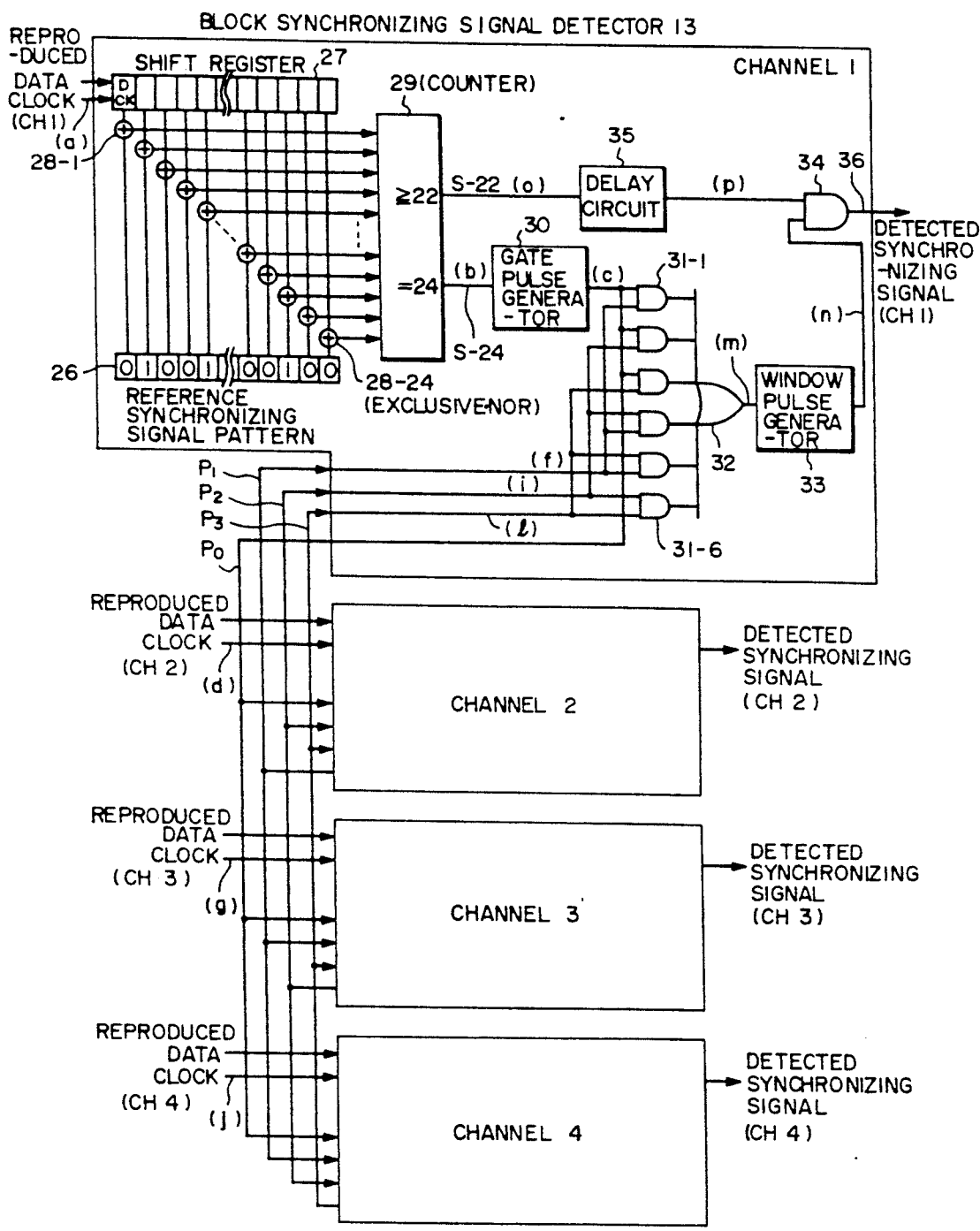
FIG. 7 is a block diagram illustrating an example of the constitution of the present invention.

FIG. 7 illustrates in block form the block synchronizing signal detector 13 for four channels. Contents of the block synchronizing signal detector 13 are the same as one another for each of four channels but details thereof are shown for channel 1 only. A reference synchronizing signal pattern is stored as shown in a register 26 and applied bit by bit to 24 exclusive-NOR gates 28-1 to 28-4. Data and clock pulses reproduced from the optical disk 1 are provided via a 24-bit shift register 27 to the 24 exclusive-NOR gates 28-1 through 28-24, respectively, and the number of output bits obtained from the 24 exclusive-NOR gates 28-1 to 28-4 in case of mutual coincidence of respective two input bits of the 24 exclusive gates 28-1 to 28-4 is counted by a counter 29 called as a bit-number counter.

Figure 8:
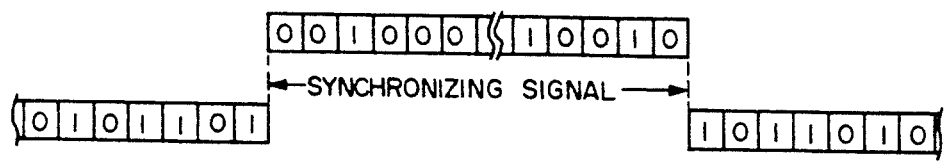
FIG. 8 illustrates bit pattern diagrams explanatory of the operation of this invention circuit.

FIG. 8 is a diagram for explaining the above-described detection of the degree of coincidence of the bit pattern of the block synchronizing signal. In FIG. 8(1) the synchronizing signal part and the data part are shown separately of each other so as to facilitate a better understanding of the reproduced data. FIG. 8(2) shows outputs of the shift register 27 in the cases where the reproduced data are delayed by three bits, two bits and one bit and where the reproduced data are not delayed. FIG. 8(3) shows inputs to the bit-number counter 29 in the cases where the input is delayed by three bits, two bits and one bit and where the input is not delayed, triangles indicating variations by data.

A reproduced data whose 24 bits have all been detected to be coincident with bits of the reference synchronizing signal pattern by counting with the bit-number counter 29 will be identified by S-24 all-bit coincident signal, and the reproduced data whose 22 or more bits have been detected to be coincident with the reproduced data signal pattern will be identified by S-22 (22 or more bit coincident signal).

In a case where the all-bit coincident signal S-24 is detected in two or more of the four beams (channels) and the 22 or more bit coincident signal S-22 is present within five bits before or after the signal S-24, the signal S-22 is also regarded as the detected synchronizing signal by the circuit construction described below.

The all-bit coincident signal S-24, whose 24 bits are coincident with all bits of the reference synchronizing signal pattern, is reshaped by a gate pulse generator 30 to a pulse $P_o$ of an a-bit width, an 8-bit width in this embodiment. The pulse $P_o$ thus produced is applied to AND circuits 31-1, 31-2 and 31-3 and, at the same time, it is sent to a similar decision circuit in each of the other three channels. Reference characters $P_1$, $P_2$ and $P_3$ denote pulses each produced from the all-bit coincident signal S-24 detected from each of the other three channel signals. These pulses are 8-bit in width and are applied to the AND circuits 31-1 through 31-6 as shown in FIG. 7. The outputs of the AND circuits 31-1 through 31-6 are each reproduced from two optical beams (channels) whose bits are all coincident with bits of the reference synchronizing signal pattern. These outputs are applied to an OR circuit 32, the output of which is provided to a window pulse generator 33, whereby it is reshaped to a window pulse of a b-bit pulse width, in this embodiment, a 10-bit width. The window pulse thus generated is fed to an AND circuit 34. The 22 or more bit coincident signal S-22 whose 22 or more bits are coincident with bits of the reference synchronizing signal is applied to the AND circuit 34 after being delayed by a delay circuit 35 for a c-bit period, in this embodiment, for a 5-bit period. The output signal 36 of the AND circuit 34 is regarded as a detected synchronizing signal.

Figure 9:
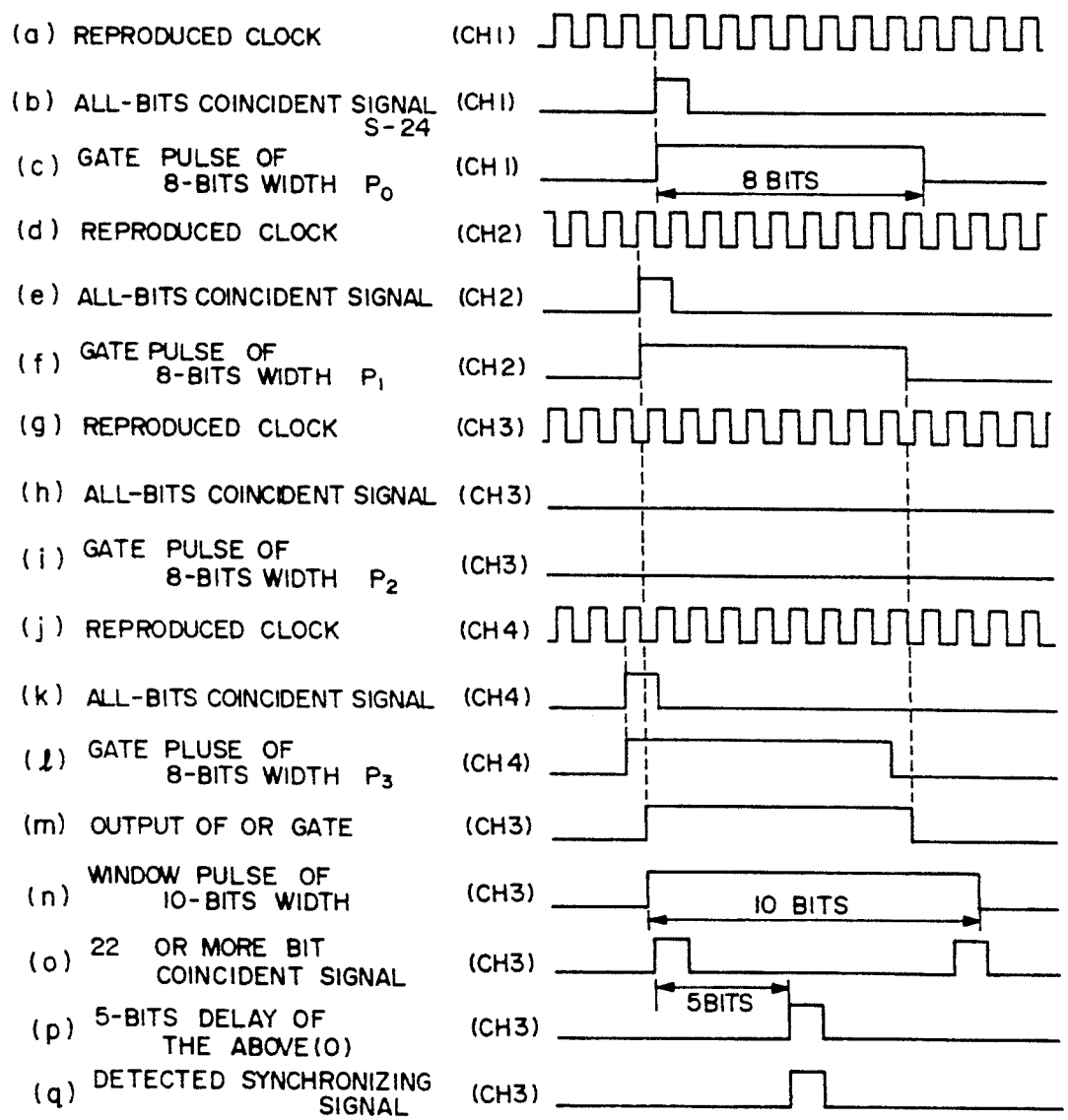
FIG. 9 shows waveform diagrams explanatory of the operation of a synchronizing signal detector according to the present invention.

FIG. 9 shows timing charts showing the above-mentioned pulses related to operations of respective parts in FIG. 7. In FIG. 9, (a) shows clock pulses reproduced from the disk, (b) the all-bit coincident signal S-24, (c) the gate pulse of an 8-bit width which is the output from the gate pulse generator 30, and (f), (i) and (l) gate pulses of an 8-bit width corresponding to the pulses $P_1$, $P_2$ and $P_3$ in FIG. 7, respectively. In this embodiment, however, no gate pulse is shown in (h) since some of the bits of the block synchronizing signal are not coincident with the reference synchronizing signal pattern. Now, let is be assumed that this channel is a third channel.

In FIG. 9, (m) show the output of the OR circuit 32, (n) the output of the window pulse generator 33, that is, the window pulse of the 10-bit width, and (o) the 22 or more bit coincident signal S-22, and in some cases, all of the 24 bits may coincide with bits of the reference synchronizing signal pattern. In this embodiment, the 22 or more bit coincident signal S-22 is assumed to appear in the third channel. Further, (p) shows the output of the 5-bit delay circuit 35 which delays the signal S-22 depicted in (O), and (q) the signal (pulse) 36 which is regard as the detected synchronizing signal.

As described above, the present invention precludes in the detection of the detected synchronizing signal 36, the possibilities of an erroneous detection of a false block synchronizing signal and a failure of detection of the normal block synchronizing signal, by gating through utilization of the block synchronizing signals of the other channels.

While the above embodiment has been described in respect of the case where the 10-bit window pulse is generated when the all-bit coincident synchronizing signal is detected for at least two of the four optical beams (channels) from the optical head, it is also possible to employ an arrangement in which when the all-bit coincident synchronizing signal is detected for three of the four beams (channels) from the optical head, a window pulse is produced which starts at the detected all-bit coincident synchronizing signal. In this instance, the six 2-input AND gates 31-1 through 31-6 shown in FIG. 7 are replaced by four 3-input AND gates.

Also for the pre-synchronizing signal, the detection of a false signal and a failure of the detection of the pre-synchronizing signal are prevented by exactly the same method as used for the block synchronizing signal.

The first block synchronizing signal of each sector is detected by the combined use of the block synchronizing signal and the pre-synchronizing signal detected very carefully as described previously, thereby preventing the detection of a false signal and a failure of the detection of the first block synchronizing signal.

Although the above embodiment has been described in connection with the multi-beam optical disk unit employing a multi-beam laser array, the method for detecting the first block synchronizing signal of each sector without fail by the combined use of the pre-synchronizing signal and the block synchronizing signal is applicable as well to a multi-beam optical disk unit and a single-beam optical disk unit.

As described above in detail, the present invention minimizes the possibility of an erroneous detection of the block synchronizing signal or a dropout of the block synchronizing signal through a failure in its detection in the multi-beam optical disk unit of the type having its optical head formed by a semiconductor laser array.

Since the first block synchronizing signal of each sector is detected by the combined use of the pre-synchronizing signal immediately preceding it and the block synchronizing signal, it is possible to prevent the first block synchronizing signal of each sector from dropping out or being erroneously detected, this being highly effective for stable signal reproduction.

What I claim is:

1. A synchronizing signal detector comprising n detecting circuits for a multi-beam optical disk unit of n optical beams, using integers n, p, m, c, b, q more than one, each of said n detecting circuits comprising:

a register for storing a p-bit reference synchronizing pattern;

p-exclusive-NOR circuits for detecting coincidence between each pulse of p-pulses reproduced from a corresponding one of said n optical beams and each pulse of the p-bit reference synchronizing signal pattern to produce coincident pulses each in response to said coincidence;

a counter for counting a number of said coincident pulses from said p-exclusive-NOR circuits to generate an all-bit coincident signal when bits of the reproduced p-pulses are all coincident with bits of said reference synchronizing signal pattern and to generate a q or more bit coincident signal when q (where $o<q<p$) or more bits reproduced from the corresponding one of said n-optical beams are coincident with bits of said reference synchronizing signal pattern;

pulse means for supplying the all-bit coincident signal to each of other $n-1$ detecting circuits and for receiving said all-bit coincident signal from said other $n-1$ detecting circuits;

window pulse generating means for generating when said all-bit coincident signal is generated by said counter for at least m (where $o<m\leq n$) of said n-optical beams, a window pulse having an arbitrary width of b-bits, which starts at said all-bit coincident signal;

a delay circuit for delaying a c-bit (where $c=b/2$) period the q or more bit coincident signal to produce an output; and an AND circuit for ANDing the output of said delay circuit and said window pulse;

wherein output pulses of said AND circuit are regarded as detected synchronizing signals in the corresponding one of said optical beams.

2. A synchronizing signal detector for a multi-beam optical disk unit according to claim 1, in which said p is twenty-four, said q is twenty-two.

3. A synchronizing signal detector for a multi-beam optical disk unit according to claim 1, in which said p is twenty-four, said q is twenty-two, said m is equal to one-half said n, said c is one-half said b.

4. A synchronizing signal detector for a multi-beam optical disk unit according to claim 3, in which said m is two, said c is five.

* * * * *